United States Patent [19]
Riggs

[11] 3,908,456
[45] Sept. 30, 1975

[54] ODOMETER FOR BOATS
[76] Inventor: Royal W. Riggs, 2406 Albert Lee, Sedalia, Mo. 65301
[22] Filed: Oct. 1, 1973
[21] Appl. No.: 402,043

[52] U.S. Cl. .................................................. 73/183
[51] Int. Cl.² ........................................ G01C 21/12
[58] Field of Search ....................... 73/183, 182, 212

[56] References Cited
UNITED STATES PATENTS
3,546,939  12/1970  Hilderbrand ......................... 73/212

*Primary Examiner*—Donald O. Woodiel
*Attorney, Agent, or Firm*—John A. Hamilton

[57] ABSTRACT

An odometer for boats consisting of a counter driven by an electric motor of variable speed, and apparatus for varying the speed of the motor in closely proportional relation to the speed of the boat. The motor may be of a type the speed of which is variable by changing the voltage of its operating circuit, and an electrical system may adjust this voltage by means of a variable rheostat operated by a pressure-sensitive device responsive to fluid pressure generated by forward movement of the boat in a passage opening forwardly adjacent the boat hull.

4 Claims, 1 Drawing Figure

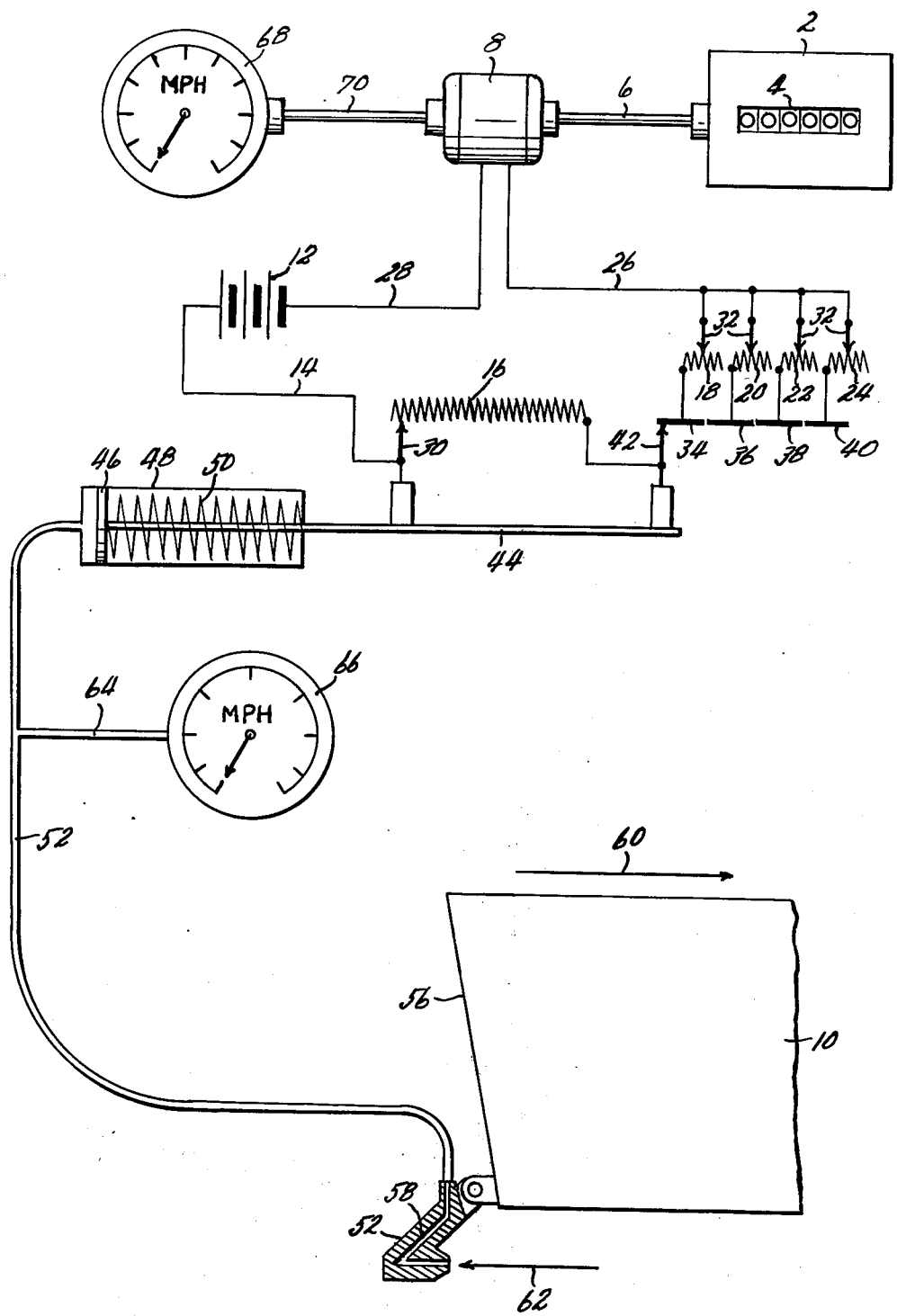

ODOMETER FOR BOATS

This invention relates to new and useful improvements in boating accessories, and has as its principal object the provision of a boat odometer which will record with acceptable accuracy the distance a boat has travelled.

Another object is the provision of a boat odometer consisting of a counter calibrated to indicate distance travelled, and driven by an electric motor, and motor speed adjusting means operable to render the speed of said motor closely proportional to the speed of travel of the boat.

A further object is the provision of a boat odometer of the character described wherein the counter motor speed is variable in response to variations of the voltage of its circuit, and wherein the motor speed adjusting means constitutes means for varying said voltage proportionately to the boat speed.

A still further object is the provision of a boat odometer of the character described wherein the motor speed adjusting means is responsive to fluid pressure generated by boat motion in a passage opening forwardly of the boat adjacent the boat hull.

Still another object is the provision of a boat odometer of the character described controlled by fluid pressure, with the addition of compensating means for correcting the error introduced by the fact that the fluid pressure is usually not closely proportional to the boat speed.

Other objects are simplicity and economy of construction, and efficiency and dependability of operation.

With these objects in view, as well as other objects which will appear in the course of the specification, reference will be had to the accompanying drawing, wherein the single view is a schematic layout of a boat odometer embodying the present invention.

In the single view of the drawing, the numeral 2 indicates a mechanically driven counter having a digital read-out window 4 for displaying the reading thereof, and is driven by a shaft 6 turned by an electric motor 8 of variable speed. The counter is calibrated to indicate the distance travelled by a boat 10, so long as the rotational speed of motor 8 is maintained proportional to the speed of travel of the boat. Motor 8 is of a type the speed of rotation of which varies proportionately to the voltage of its operating circuit. The circuit of motor 8 is supplied by a storage battery 12 through wire 14, a variable resistor 16, one of a series of low value variable trim resistors 18, 20, 22 and 24, wire 26, motor 8 and wire 28 to battery 12, so that the motor speed is regulated by resistors 16 to 24. Resistor 16 is provided with a movable contact 30 which is positioned by boat speed as will be described, and each of resistors 18 to 24 is provided with a movable contact 32 each of which is manually movable independently of any other. Resistors 18–24 are connected respectively to a series of slide contacts 34, 36, 38 and 40, said contacts being fixed and electrically independent, but being swept successively by a movable contact 42 as the speed of the boat increases. Contacts 30 and 42 are both carried fixedly by a member 44 attached to a piston 46 movable in a fluid cylinder 48 against the pressure of a spring 50 when fluid pressure is supplied thereto through a flexible tubular conduit 52. Conduit 52 is connected to a pitot tube device 54 mounted on boat 10, usually at the stern transom 56 thereof. The conduit communicates with a passage 58 of the pitot tube, said passage opening forwardly of the boat, it being understood that the boat travels in the direction of arrow 60, so that forward travel of the boat forces water into the tube in the direction of arrow 62 to create and maintain fluid pressure in conduit 52 as long as the boat is moving, said fluid pressure being at least generally proportional to the speed of the boat. The pitot tube opening should be disposed beneath the boat hull, and at one side thereof to avoid the propeller wash.

A branch conduit 64 from conduit 52 may supply pressure to operate a boat speedometer 66, which may be calibrated in miles per hour to indicate boat speed, and which it will be understood may be operated by a pressure-responsive device, not shown, similar to piston 46 and cylinder 48 of the odometer, or even by the same piston-cylinder arrangement. This speedometer, however, forms no intrinsic part of the present invention, except insofar as it may be used in setting the calibration of the odometer as will be described.

Also as an aid in calibrating the odometer, there may be provided a tachometer 68 driven by motor 8 through a shaft 70. While the tachometer may be calibrated in miles per hour, as indicated, it should be kept in mind that it does not necessarily indicate actual boat speed unless the odometer is properly adjusted and calibrated, and actually indicates only the speed of motor 6, and therefore the rate at which mileage is being recorded by counter 2.

In operation, the parts have the position shown in the drawing when the boat is at rest, the lack of fluid pressure in conduit 52 and cylinder 48 permitting contact 30 to insert the full resistance of resistor 16 in the motor circuit, so that motor 6 does not operate. As the boat speed increases, pressure in cylinder 48 also increases, moving piston 46 against spring 50 to move contact 30 to reduce the effective value of resistor 16 to increase the voltage of the motor circuit and increase the operating speed of the motor progressively as the boat speed increases, the motor driving counter 2 at corresponding speeds to record the mileage travelled. The odometer reading will be correct and accurate so long as the motor speed is directly proportional to boat speed. The motor speed is proportionate to the voltage of its operating circuit, which in turn is proportionate to the position of piston 46 in cylinder 48, which is in turn proportionate to the fluid pressure in said cylinder, which in turn is at least generally proportionate to the boat speed as heretofore described. The final proportionate relationship just referred to, that between the fluid pressure and boat speed, may be a sufficiently linear relationship that the counter will record travel with sufficient accuracy to be acceptable for general purposes. However, this relationship is as a matter of fact seldom linear, so that in most cases successive equal increments of boat speed will produce unequal increments of pressure, due to several causes but principally due to changing patterns of water turbulence around the boat hull at different speeds. These variations make little difference to the accuracy of speedometer 66, since they may be compensated for by unequal spacing of the scale marks of the speedometer, as indicated, but could cause substantial and cumulative error in the odometer reading.

Trim resistors 18, 20, 22 and 24 are provided to compensate for variations in the proportionality of fluid pressure to boat speed. The slide contacts of these resistors are swept consecutively by contact 42 as the boat speed increases, since contact 42 is also moved by piston 46, so that the trim resistors are inserted selectively into the motor circuit at different zones of the total range of speed of the boat. Thus the odometer may be more accurately calibrated by operating the boat first at a speed such that contact 42 engages contact 34 of resistor 18, then adjusting resistor 18 so that counter 2 is recording at the proper rate. This may be done by manually moving contact 32 of resistor 18 until the reading of tachometer 68 coincides with that of speedometer 66, in which case the odometer reading will be as accurate as the speedometer, or by calculating actual speed of the boat over a measured course and adjusting resistor 18 to bring tachometer 68 to a reading corresponding to that actual speed. The process is then repeated with contact 42 engaging each of contacts 36, 38, and 40. The odometer will then record distance travelled with improved accuracy in all speed ranges. While four trim resistors are shown, still greater accuracy could be attained by the use of a greater number, and the number actually used is limited only by the degree of accuracy desired.

The control of both the odometer and of speedometer 66 from the same pressure-responsive piston 46, or from any comparable pressure-responsive device such as an aneroid capsule, would conveniently provide a combination speedometer-odometer such as is used in automobiles, which would be a most useful device. Also, in some cases it might be useful to utilize a voltage regulator for insuring a uniform voltage supplied to the motor circuit despite changes in the condition of or load on battery 12.

Nevertheless, while I have shown and described a specific embodiment of my invention, it will be readily apparent that many minor changes of structure and operation, including those mentioned above as well as others, could be made without departing from the spirit of the invention.

What I claim as new and desire to protect by Letters Patent is:

1. An odometer for boats comprising:
   a. a counter,
   b. variable speed driving means operable to drive said counter, and
   c. control means operable to regulate the speed of said driving means proportionately to the speed of travel of a boat, said control means comprising a pitot tube adapted to be mounted on a boat and having an opening facing forwardly of said boat adjacent the hull thereof, pressure-responsive means interconnected with said pitot tube opening and operable responsively to pressure variations in said pitot tube caused by changes of speed of said boat to regulate the speed of said driving means proportionately to the pressure generated in said pitot tube by movement of said boat, and adjusting means operable to vary the response of said pressure-responsive means to pressure changes in said pitot tube, said adjusting means being operable independently in a plurality of zones over the speed range of the boat, whereby to compensate for nonlinear proportionality between the pitot tube pressure and the actual speed of the boat.

2. An odometer as recited in claim 1 with the addition of a tachometer driven by said driving means to indicate the actual recording rate of said counter, whereby by comparing said recording rate to the actual boat speed, the recording rate may be corrected by use of said adjusting means.

3. An odometer as recited in claim 1 wherein said driving means constitutes an electric motor the speed of which is variable in direct proportion to the voltage of its operating electric circuit; wherein said pressure-responsive means comprises an operative electric circuit including a source of electric power and said motor, a variable resistor connected in series in said motor circuit, and a pressure-sensitive device connected to said pitot tube opening and operable to adjust said variable resistor in inverse ratio to the pressure generated in said pitot tube by movement of said boat; and wherein said adjusting means comprises a plurality of trim resistors, means operable by said pressure-sensitive device to insert said trim resistors selectively into said motor circuit, successively at different zones of the full pressure range supplied by said pitot tube, and manually operable means for adjusting the resistance of each of said trim resistors.

4. An odometer as recited in claim 3 with the addition of a tachometer driven by said electric motor whereby to indicate the actual recording rate of said counter, whereby by comparison of said actual recording rate with the actual speed of the boat as measured by other means, said recording rate may be corrected by adjusting said trim resistors.

* * * * *